(12) United States Patent
Shemtov

(10) Patent No.: US 10,295,094 B2
(45) Date of Patent: May 21, 2019

(54) CONDUIT BODY WITH SUPER FITTING

(71) Applicant: Atkore Steel Components, Inc., Coconut Creek, FL (US)

(72) Inventor: Sami Shemtov, Hollywood, FL (US)

(73) Assignee: Atkore Steel Components, Inc., Coconut Creek, FL (US)

( * ) Notice: Subject to any disclaimer, the term of this patent is extended or adjusted under 35 U.S.C. 154(b) by 132 days.

(21) Appl. No.: 15/177,005

(22) Filed: Jun. 8, 2016

(65) Prior Publication Data
US 2017/0356576 A1 Dec. 14, 2017

(51) Int. Cl.
| F16L 19/065 | (2006.01) |
| F16L 19/06 | (2006.01) |
| F16L 19/07 | (2006.01) |
| H02G 3/04 | (2006.01) |
| H02G 3/06 | (2006.01) |

(52) U.S. Cl.
CPC ............ *F16L 19/061* (2013.01); *F16L 19/07* (2013.01); *H02G 3/04* (2013.01); *H02G 3/06* (2013.01); *F16L 19/065* (2013.01)

(58) Field of Classification Search
CPC ....... F16L 19/06; F16L 19/061; F16L 19/062; F16L 19/065; F16L 19/07
USPC .................. 285/154.1, 149.1, 386, 389, 393
See application file for complete search history.

(56) References Cited

U.S. PATENT DOCUMENTS

| 1,823,061 A * | 9/1931 | Pearson ................. F16L 19/08 277/607 |
| 1,851,729 A * | 3/1932 | Raybould ............... F16L 19/08 285/393 |
| 1,888,343 A * | 11/1932 | Bohlman ................ F16L 19/08 285/382.7 |
| 3,415,942 A * | 12/1968 | Knoy .................... H02G 3/0616 174/51 |
| 4,798,404 A * | 1/1989 | Iyanicki ............... F16L 19/062 285/12 |
| 8,376,411 B2 * | 2/2013 | Newby ................. F16L 55/172 174/50 |
| 8,586,881 B1 * | 11/2013 | Shemtov ............... F16L 19/061 174/652 |
| 9,647,432 B2 | 5/2017 | Yeh |
| 2004/0255608 A1 * | 12/2004 | Hector .................. F16L 19/065 62/474 |

(Continued)

FOREIGN PATENT DOCUMENTS

GB 2045376 A * 10/1980 ............ F16L 27/047

*Primary Examiner* — Aaron M Dunwoody

(57) ABSTRACT

Provided herein are exemplary connector assemblies including a conduit body having a conduit inner surface opposing a conduit outer surface, at least a portion of the conduit inner surface being a threaded portion. The connector assemblies may further include a compression ring extending from a first circumferential end to a second circumferential end, wherein the first circumferential end is complementarily engageable with the second circumferential end, wherein the compression ring includes a first axial end and a second axial end, and wherein the compression ring has a circumferential gap between the first circumferential end and the second circumferential end in an uncompressed configuration. The connector assemblies may further include a bushing positioned within the threaded portion of the conduit inner surface of the conduit body.

20 Claims, 6 Drawing Sheets

(56) References Cited

U.S. PATENT DOCUMENTS

2014/0145435 A1* 5/2014 Zhu ................ F16L 19/061
   285/355
2016/0097475 A1 4/2016 Shemtov

* cited by examiner

CONDUIT BODY WITH SUPER FITTING

FIELD OF THE DISCLOSURE

The disclosure relates generally to conduit connector assemblies and, more particularly, to conduit connector assemblies including a compression ring and bushing.

BACKGROUND OF THE DISCLOSURE

Electrical and mechanical components such as cables often need to be connected with each other through various angles and configurations. Conduits (e.g., pipes) and junction boxes may be used to house electrical cables, and connectors are used to join conduits with each other and/or with other components such as junction boxes in desired configurations. Connector assemblies make use of such connector elements as connector bodies, nuts, gaskets, etc., to provide the configurations desired for the conduits that house electrical and mechanical components.

The components brought together by connector assemblies can be sensitive to contaminants such as dust and moisture. If a proper seal is not formed between and among the elements of the connector assembly, the electrical and mechanical components may be susceptible to contamination and resulting in damage.

Furthermore, traditional connector assemblies are not able to accommodate both threaded and unthreaded conduits. For example, a connector assembly with a compression ring having a smooth inner surface is intended to secure unthreaded conduits. Similarly, existing repair coupling assemblies are intended to secure threaded conduits.

Still furthermore, traditional connector assembly bodies can have rough internal openings that may cut or damage conductors, especially when being pulled.

SUMMARY

In view of the foregoing, what is needed is a versatile connector assembly that provides superior resistance to contaminants like dust and moisture. Furthermore, what is needed is a connector assembly able to conveniently accommodate both threaded and unthreaded conduits in different situations. Still furthermore, what is needed is a connector assembly able to reduce potential for damage to conductors.

An exemplary connector assembly in accordance with the present disclosure may include a conduit body having a conduit inner surface opposing a conduit outer surface, at least a portion of the conduit inner surface being a threaded portion. The connector assembly may further include a compression ring extending from a first circumferential end to a second circumferential end, wherein the first circumferential end is complementarily engageable with the second circumferential end, wherein the compression ring includes a first axial end and a second axial end, and wherein the compression ring has a circumferential gap between the first circumferential end and the second circumferential end in an uncompressed configuration. The connector assembly may further include a bushing positioned along the conduit inner surface within the conduit body.

An exemplary connector assembly in accordance with the present disclosure may include a connector assembly including a conduit body and a compression ring, the connector assembly comprising a conduit body having a conduit inner surface opposing a conduit outer surface, at least a portion of the conduit inner surface being a threaded portion. The connector assembly may further include a compression ring extending from a first circumferential end to a second circumferential end, wherein the first circumferential end is complementarily engageable with the second circumferential end, wherein the compression ring includes a first axial end and a second axial end, and wherein the compression ring has a circumferential gap between the first circumferential end and the second circumferential end in an uncompressed configuration. The connector assembly may further include a bushing positioned within the threaded portion of the conduit inner surface of the conduit body.

An exemplary connector assembly in accordance with the present disclosure may include a conduit body having a conduit inner surface opposing a conduit outer surface, at least a portion of the conduit inner surface being a threaded portion. The connector assembly may further include a compression ring extending from a first circumferential end to a second circumferential end, wherein the first circumferential end is complementarily engageable with the second circumferential end, wherein the compression ring includes a first axial end and a second axial end, and wherein the compression ring has a circumferential gap between the first circumferential end and the second circumferential end in an uncompressed configuration. The connector assembly may further include an insert adjacent the conduit body, the insert including a first threaded portion and a second threaded portion, wherein the first threaded portion engages the threaded portion of the conduit inner surface. The connector assembly may further include a bushing positioned along an inner surface of the first axial end of the insert.

The accompanying drawings illustrate exemplary approaches of the disclosed embodiments so far devised for the practical application of the principles thereof.

FIG. 1 is a partially exploded perspective view of a connector assembly in accordance with an embodiment of the present disclosure.

FIGS. 2A-D are perspective views of various conduit bodies in accordance with embodiments of the present disclosure.

Figure 1:
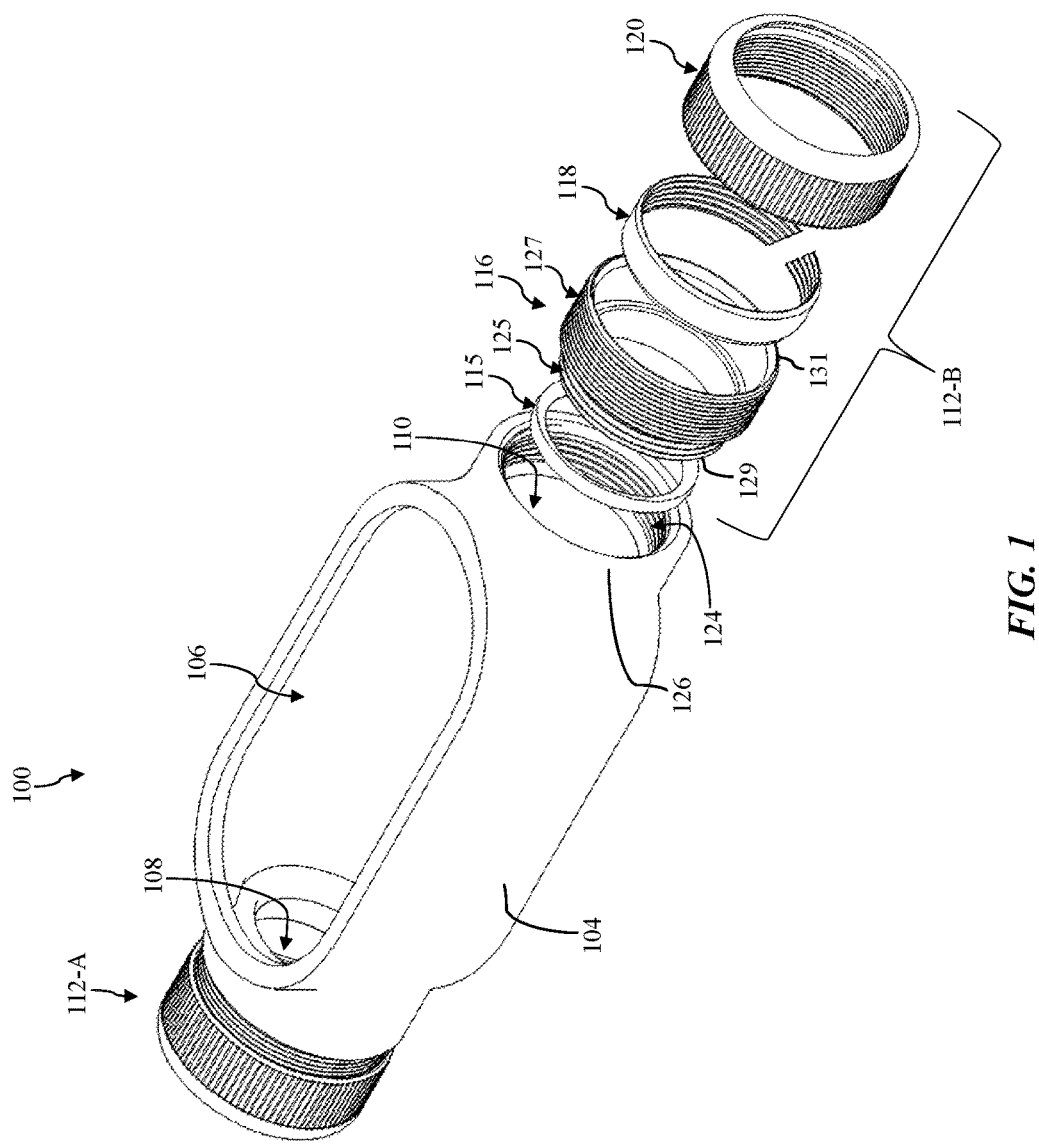
Figure 2A:
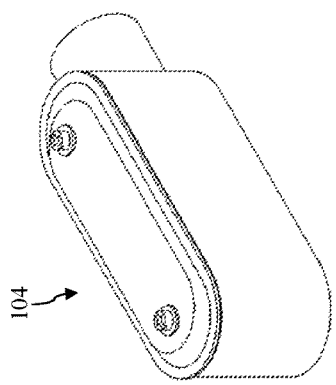
Figure 2B:
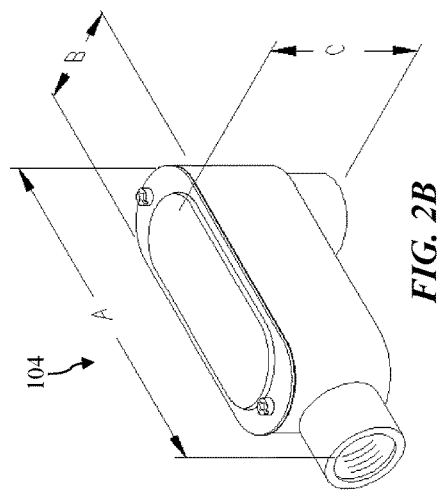
Figure 2C:
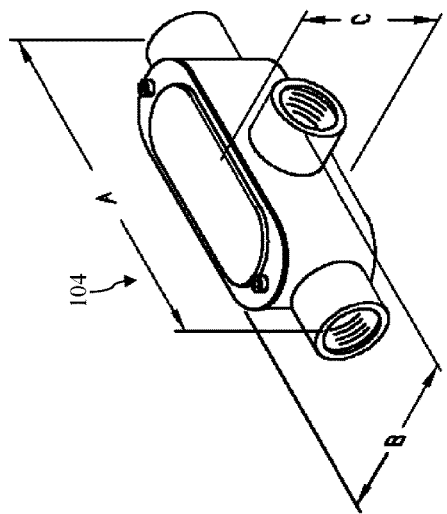
Figure 2D:
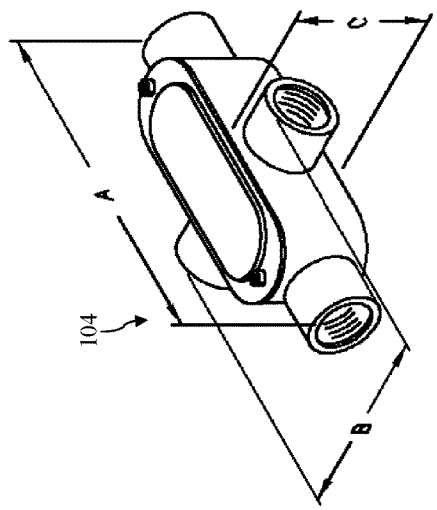

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

Assemblies and in accordance with the present disclosure will now be described more fully hereinafter with reference to the accompanying drawings, where embodiments of the system and method are shown. The assemblies may be embodied in many different forms and are not be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

Provided herein are approaches for forming a connection with a conduit body. In one approach, an exemplary connector assembly includes a connector assembly including a conduit body and a compression ring, the connector assembly comprising a conduit body having a conduit inner surface opposing a conduit outer surface, at least a portion of the conduit inner surface being a threaded portion. The connector assembly may further include a compression ring extending from a first circumferential end to a second circumferential end, wherein the first circumferential end is complementarily engageable with the second circumferential end, wherein the compression ring includes a first axial end and a second axial end, and wherein the compression ring has a circumferential gap between the first circumferential end and the second circumferential end in an uncompressed configuration. The connector assembly may further include a bushing positioned within the threaded portion of the conduit inner surface of the conduit body. Accordingly, provided is a connector assembly, which creates a compression-type coupling that can work for both threaded and unthreaded conduits, and can provide protection to wires during pulling by the bushing.

Referring now to FIG. 1, an exemplary embodiment of a connector assembly in accordance with the present disclosure is shown. The connector assembly 100 includes a conduit body 104 having a central opening 106, a first opening 108, and a second opening 110 opposite the first opening 108. Coupled to the first and second openings 108, 110 are respective conduit coupling assemblies 112A-B. As shown in the exploded view of the coupling assembly 112-B, the second opening 110 may engage a bushing 115, an insert 116, a compression ring 118, and a compression nut 120, each of which will be described in greater detail below. A seal formed by each conduit coupling assembly 112A-B resists contaminants such as dust and moisture from penetrating the conduit body.

At each of the first and second openings 108, 110, the conduit body 104 may include a conduit inner surface 124 opposing a conduit outer surface 126. In some embodiments, at least a portion of the conduit inner surface 124 is a threaded portion. Furthermore, each of the first and second openings 108, 110 may be generally cylindrical for receiving cylindrical conduits, although embodiments herein are not limited to any single connection type.

As shown, the insert 116 is positioned adjacent the conduit body 104, and includes a first threaded portion 125 and a second threaded portion 127. In some embodiments, the first and second threaded portions 125, 127 are located on an exterior surface of the insert 116 such that the first threaded portion 125 is configured to engage the threaded portion of the conduit inner surface 124. In one embodiment, an inner diameter of the insert 116 proximate the first threaded portion 125 is smaller than an inner diameter proximate the second threaded portion 127. The insert 116 further includes a first axial end 129 and a second axial end 131, wherein the second axial end 131 is configured to engage the compression ring 118, as will be further described below.

It will be appreciated that the conduit body shown in FIG. 1 represents only one possible configuration. For example, some conduit bodies may have only one threaded hubs/openings, while others have up to 4 threaded hubs/openings. Various conduit bodies according to non-limiting embodiments of the present disclosure are shown in FIGS. 2A-D.

Figure 3:
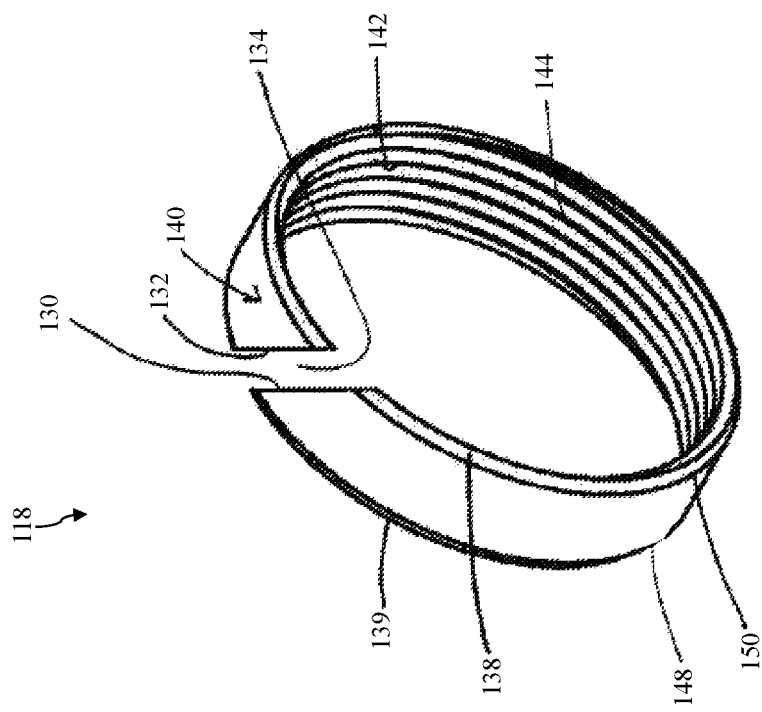
FIG. 3 is a perspective view a compression ring of the connector assembly of FIG. 1 in accordance with an embodiment of the present disclosure.

Referring now to FIGS. 1 and 3, the compression ring 118 will be described in greater detail. As shown, the compression ring 118 includes a first circumferential end 130 and a second circumferential end 132 that is complementarily engageable with the first circumferential end 130. The compression ring 118 also includes a circumferential gap 134 between the first circumferential end 130 and the second circumferential end 132. The circumferential gap 134 of the compression ring 118 allows the compression ring 118 to compress, such compression bringing the first circumferential end 130 and the second circumferential end 132 closer together and narrowing the circumferential gap 134. In some embodiments, the circumferential gap 134 narrows but need not necessarily close for a conduit to be secured to the conduit body 104. In other embodiments, when the compression ring 118 fully compressed, the first and second circumferential ends 130, 132 complementarily abut each other.

The compression ring 118 may optionally include a first bevel 138 for enhancing compression of the compression ring 118 and the interaction of the compression ring 118 with the compression nut 120. The compression ring 118 may also include a second bevel 139 for enhancing interaction of the compression ring with the insert 116.

As shown, the compression ring 118 further includes a compression ring outer surface 140 opposing a compression ring inner surface 142, with internal threading 144 (e.g., a set of teeth) extending radially inwardly from the compression ring inner surface 142. At least some of the internal threading 144 extend circumferentially from the first circumferential end 130 to the second circumferential end 132, allowing the teeth of the internal threading 144 to serve as an inner engagement mechanism. The compression ring 118 extends from a first axial end 148 to a second axial end 150.

It will be appreciated that the compression ring 118 may be shaped in a variety of different ways. For example, the compression ring 118 need not include first and second bevels 138, 139 in some embodiments. Furthermore, the complementarily interfittable circumferential ends 130 and 132 can alternatively be shaped as complementary geometric shapes, curves, teeth, or any male/female combination of shapes that can fit together.

Figure 4:
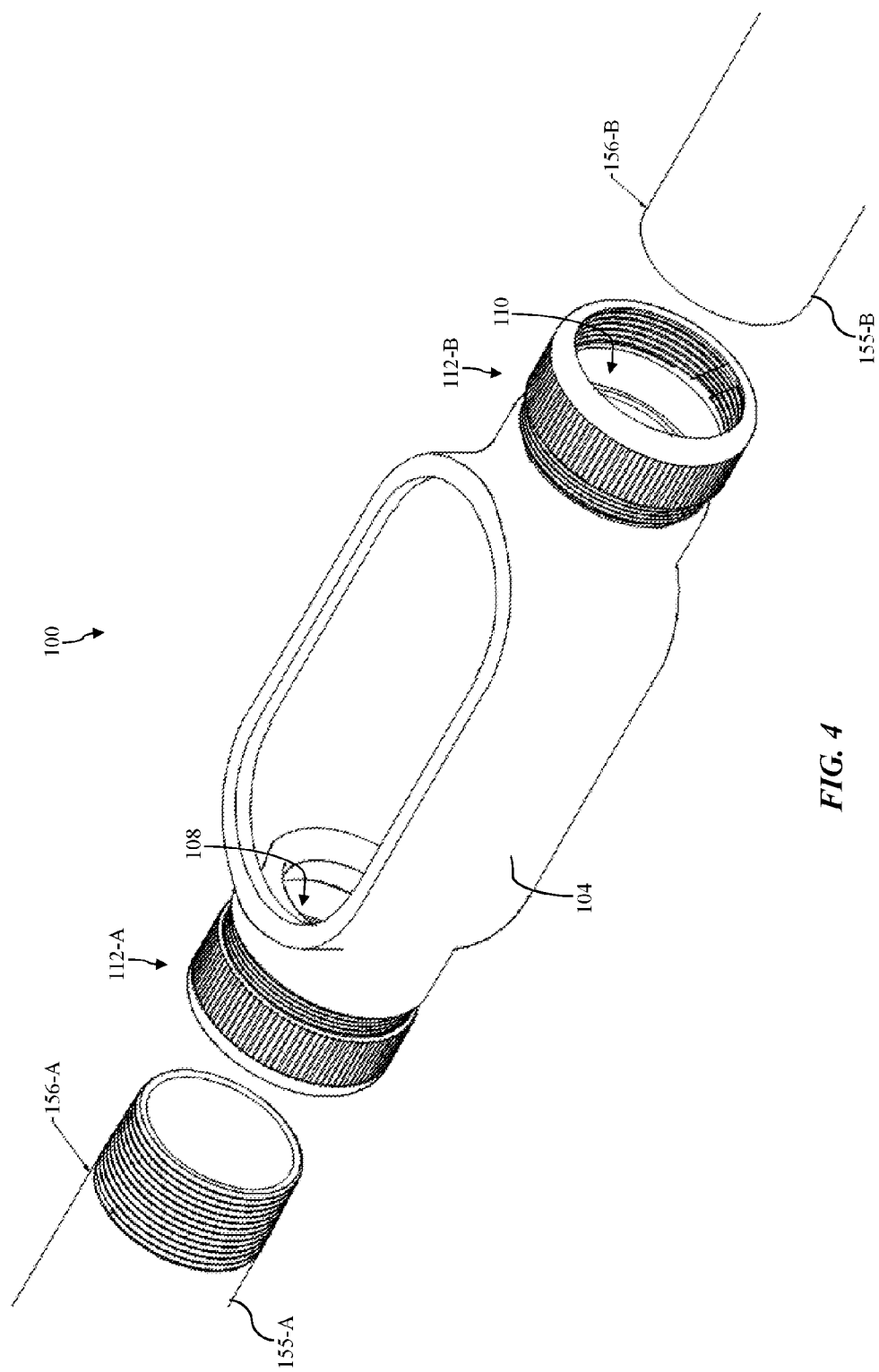
FIG. 4 is a perspective view the connector assembly of FIG. 1 in accordance with an embodiment of the present disclosure.

As shown in FIG. 4, the connector assembly 100 may include one or more conduits 155A-B coupled to and extending through the first and/or second openings 108, 110 of the conduit body 104. The conduits 155A-B have respective engagement surfaces 156A-B configured for attachment to coupling assemblies 112A-B. As will be described in greater detail below, the engagement surfaces 156A-B may include either a threaded exterior surface or an unthreaded (e.g., smooth) exterior surface.

Figure 5:
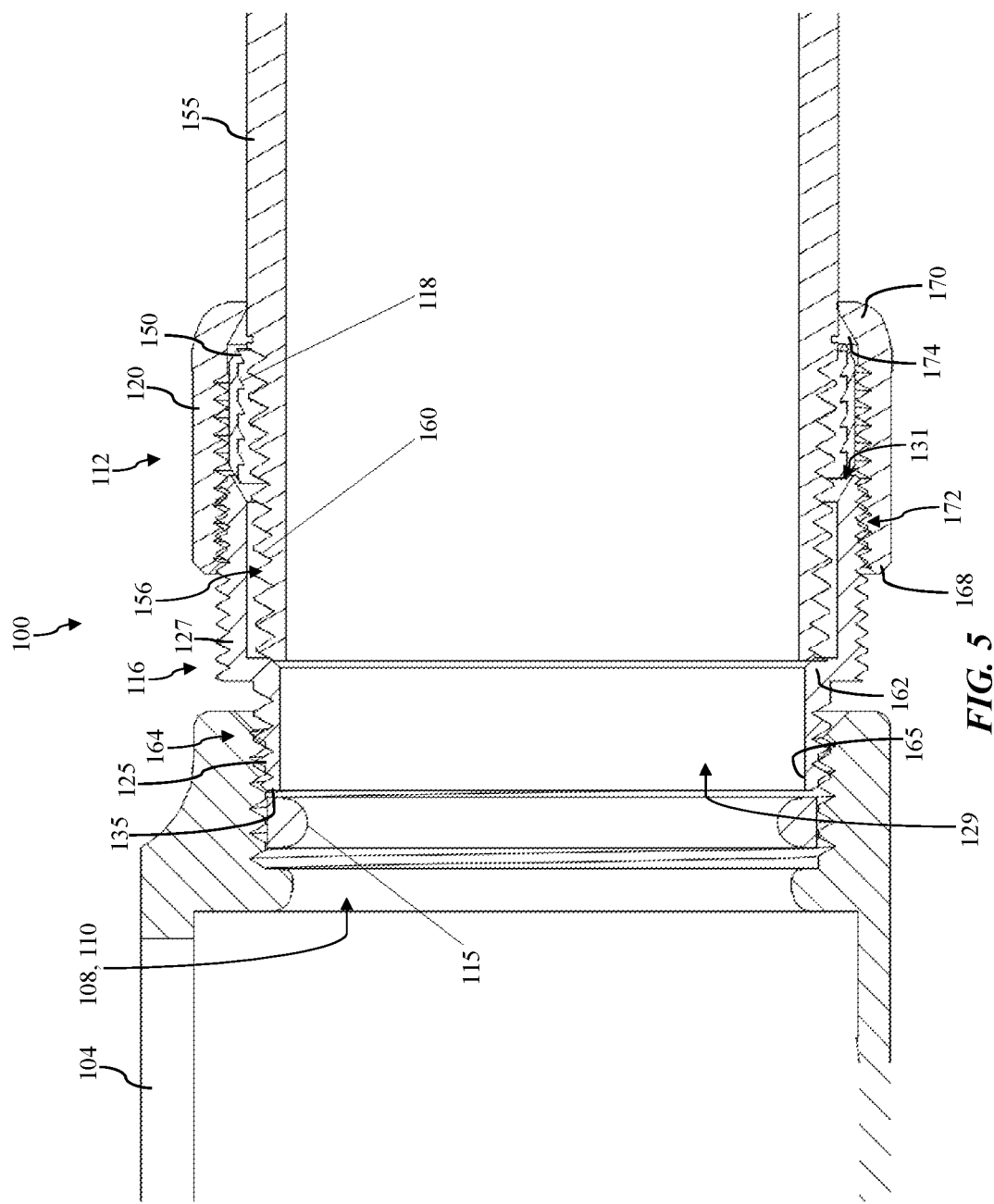
FIG. 5 is a side cutaway view the connector assembly of FIG. 1 in accordance with an embodiment of the present disclosure.

Turning now to FIG. 5, the connector assembly 100 according to embodiments of the disclosure will be described in greater detail. As shown, the conduit 155 is engaged with and secured to the conduit body 104 by the coupling assembly 112. Specifically, the conduit 155, which in this non-limiting embodiment includes exterior threading 160 along the engagement surface 156, is positioned within the insert 116, the compression ring 118, and the compression nut 120. Examples of threaded conduits include a threaded Rigid Metal Conduit ("RMC") and a threaded Intermediate Metal Conduit (IMC). The conduit 155 extends along a length of the second threaded portion 127 until it engages a corner 162 defining an intersection of the second threaded portion 127 and the first threaded portion 125. As shown, the first threaded portion 125 engages a threaded portion 164 of the conduit inner surface 124 (FIG. 1).

The insert 116 further includes the first axial end 129 and the second axial end 131, wherein the second axial end 131 is configured to abut the compression ring 118. In one embodiment, the second axial end 131 is chamfered. As shown, the first axial end 129 includes the bushing 115 contained therein such that the bushing 115 may be located proximate the threaded portion 164 of the conduit body 104. In one embodiment, the bushing 115 is disposed along an inner surface 165 of the first axial end 129 of the insert 116 to prevent scraping of an insulation (not shown) by surfaces within the conduit body 104 during use. In another embodiment, the bushing 115 is positioned in direct contact with the conduit inner surface 124, and abuts a side/end 135 of the first axial end 129. The bushing 115 may be made from an insulating material such as nylon.

During assembly, the conduit 155 is secured within the insert 116 and the compression ring 118, and then further tightened by the compression nut 120. As shown, the compression nut 120 includes a first axial end 168 and a second axial end 170, and a threaded inner surface 172 engaging the second threaded portion 127 of the insert 116. The second axial end 170 of the compression nut 120 may include a bevel or inner chamfer 174 in engagement with the second axial end 150 of the compression ring 118.

As the compression nut 120 is secured along the insert 116, the compression ring 118 is compressed between the second axial end 131 of the insert 116 and the inner chamfer 174. The grip of the compression ring 118 on the exterior threading 160 of the conduit 155 is enhanced as the compression ring 118 becomes more compressed by the compression nut 120. In exemplary approaches, the pitch of the internal threading 144 of the compression ring may match the pitch of the threading 160 of the conduit 155.

Figure 6:
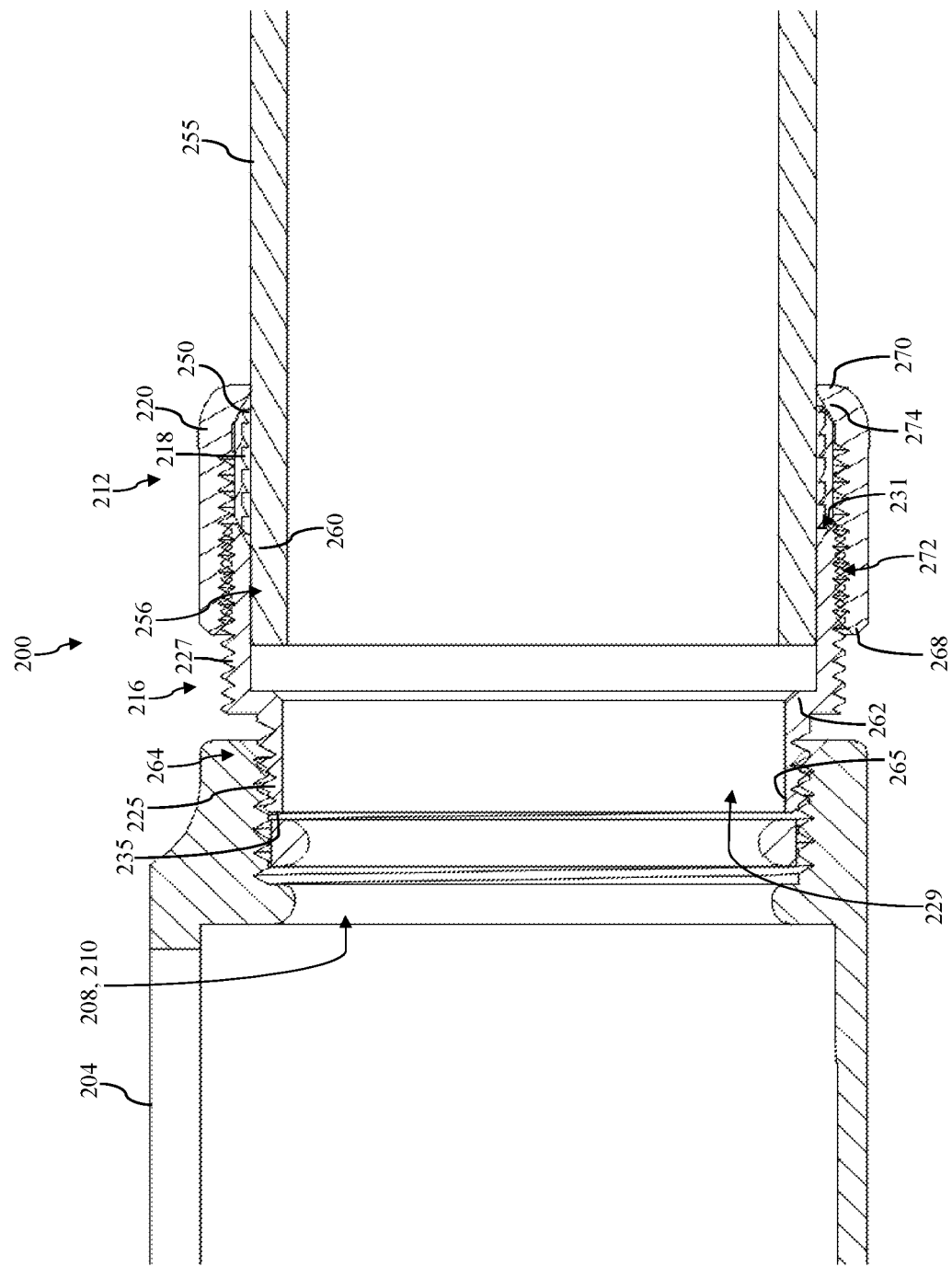
FIG. 6 is a side cutaway view the connector assembly of FIG. 1 in accordance with an embodiment of the present disclosure.

Turning now to FIG. 6, a connector assembly 200 according to another embodiment of the disclosure will be described in greater detail. The elements of the connector assembly 200 have reference numerals that are the same as the reference numerals used to describe the connector assembly 100 above and, as such, may not each be discussed again here for the sake of brevity. In this embodiment, the conduit 255 includes a smooth, non-threaded portion 260 along its engagement surface 256. Examples of unthreaded conduits include unthreaded RMC and unthreaded IMC conduits, as well as unthreaded thin wall Electrical Metal Conduits ("EMTs"). The non-threaded portion 260 is positioned within the insert 216, the compression ring 218, and the compression nut 220 such that the conduit 255 extends along a length of the second threaded portion 227 until it engages a corner 262 defining an intersection of the second threaded portion 227 and the first threaded portion 225. As shown, the first threaded portion 225 engages a threaded portion 264 of the conduit inner surface 224.

During use, the conduit 255 is secured within the insert 216 and the compression ring 218, and then further tightened by the compression nut 220. As shown, the compression nut 220 includes a first axial end 268 and a second axial end 270, and a threaded inner surface 272 engaging the second threaded portion 227 of the insert 216. The second axial end 270 of the compression nut 220 may include a bevel or inner chamfer 274 in engagement with the second axial end 250 of the compression ring 218.

As the compression nut 220 is secured along the insert 216, the compression ring 218 is compressed between the second axial end 231 of the insert 216 and the inner chamfer 274. The grip of the compression ring 218 on the non-threaded portion 260 along its engagement surface 256 is enhanced as the compression ring 218 becomes more compressed by the compression nut 220. That is, with unthreaded conduit 255, the gripping is accomplished in response to the sharp threads of the compression ring 218 biting into the engagement surface 256.

Embodiments described herein offer at least the following advantages. Firstly, unlike prior approaches in which long, heavy threaded pipes are turned or screwed into the conduit body, turning of the conduit is not required. For example, conduits can have diameters of up to four inches, and with lengths of ten feet, can weigh about 150 pounds. When a conduit must be secured to a traditional connector assembly (or disengaged therefrom) by being screwed with complementarily threaded fittings, the user must rotate a heavy and bulky conduit in potentially tight spots. Because the threaded compression ring of this disclosure allows the compression ring to bite down into the conduit to secure the conduit to the connector assembly, it is not necessary to rotate large conduits to screw them into fittings in order to secure them in the field.

Secondly, the connector assembly may be used with an unthreaded conduit, thus reducing dirt and contamination caused by cutting and threading of conduits. Thirdly, when wires are pulled into the conduit body, the bushing of the disclosure prevents the wires from scraping against interior surfaces of the conduit body, thus reducing damage. Fourthly, the connection assembly may be rain-tight, allowing it to be used in wet locations.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

The invention claimed is:

1. A connector assembly comprising:
   a conduit body having a conduit inner surface opposing a conduit outer surface, at least a portion of the conduit inner surface being a threaded portion;
   a compression ring extending from a first circumferential end to a second circumferential end, wherein the first circumferential end is complementarily engageable with the second circumferential end, wherein the compression ring includes a first axial end and a second axial end, and wherein the compression ring has a circumferential gap between the first circumferential end and the second circumferential end in an uncompressed configuration;
a bushing positioned along the threaded portion of the conduit inner surface within the conduit body; and
an insert having a first axial end and a second axial end, wherein the first axial end is coupled to the conduit inner surface of the conduit body, and wherein an inside diameter of the bushing is less than an inside diameter of the first axial end of the insert.

2. The connector assembly of claim 1, insert including a first threaded portion and a second threaded portion, wherein the first threaded portion engages the threaded portion of the conduit inner surface.

3. The connector assembly of claim 2, wherein the second axial end of the insert abuts the compression ring.

4. The connector assembly of claim 3, wherein the second axial end of the insert is chamfered.

5. The connector assembly of claim 3, further comprising a compression nut having a threaded inner surface in engagement with the second threaded portion of the insert.

6. The connector assembly of claim 3, wherein the bushing is disposed internal to the threaded portion of the conduit inner surface.

7. The connector assembly of claim 3, wherein the bushing is positioned directly adjacent the first axial end of the insert.

8. The connector assembly of claim 1, wherein the conduit body has a central opening through a sidewall, and a first opening opposite a second opening, each of the first opening and the second opening including the conduit inner surface opposing the conduit outer surface.

9. The connector assembly of claim 8, further including a conduit extending into the insert, wherein the inside diameter of the bushing is less than an inside diameter of the conduit.

10. The connector assembly of claim 9, wherein the conduit comprises an engagement surface coupled to the compression ring, the engagement surface including either of: a threaded exterior surface, or an unthreaded exterior surface.

11. A connector assembly including a conduit body and a compression ring, the connector assembly comprising:
a conduit body having a conduit inner surface opposing a conduit outer surface, at least a portion of the conduit inner surface being a threaded portion;
a compression ring extending from a first circumferential end to a second circumferential end, wherein the first circumferential end is complementarily engageable with the second circumferential end, wherein the compression ring includes a first axial end and a second axial end, and wherein the compression ring has a circumferential gap between the first circumferential end and the second circumferential end in an uncompressed configuration;
a bushing positioned in direct physical contact with threading of the threaded portion of the conduit inner surface of the conduit body; and
an insert having a first axial end and a second axial end, wherein the first axial end is coupled to the conduit inner surface of the conduit body, and wherein an inside diameter of the bushing is less than an inside diameter of the first axial end of the insert.

12. The connector assembly of claim 11, the insert including a first threaded portion and a second threaded portion, wherein the first threaded portion engages the threaded portion of the conduit inner surface.

13. The connector assembly of claim 12, wherein the second axial end of the insert has a chamfer in abutment with the first axial end of the compression ring.

14. The connector assembly of claim 13, wherein the bushing is positioned directly adjacent the first axial end of the insert.

15. The connector assembly of claim 13, further comprising a compression nut having a threaded inner surface in engagement with the second threaded portion of the insert, and an inner chamfer in engagement with the second axial end of the compression ring.

16. The connector assembly of claim 11, wherein the conduit body has a central opening through a sidewall, and a first opening opposite a second opening, each of the first opening and the second opening including the conduit inner surface opposing the conduit outer surface.

17. The connector assembly of claim 11, further comprising a conduit extending into the insert, wherein the inside diameter of the bushing is less than the inside diameter of the first axial end of the insert and an inside diameter of the conduit.

18. The connector assembly of claim 17, wherein the conduit comprises an engagement surface coupled to the compression ring, the engagement surface including either of: a threaded exterior surface, or an unthreaded exterior surface.

19. A connector assembly including a conduit body and a compression ring, the connector assembly comprising:
a conduit body having a conduit inner surface opposing a conduit outer surface, at least a portion of the conduit inner surface being a threaded portion;
a compression ring extending from a first circumferential end to a second circumferential end, wherein the first circumferential end is complementarily engageable with the second circumferential end, wherein the compression ring includes a first axial end and a second axial end, and wherein the compression ring has a circumferential gap between the first circumferential end and the second circumferential end in an uncompressed configuration;
an insert including a first threaded portion and a second threaded portion, wherein the first threaded portion engages the threaded portion of the conduit inner surface; and
a bushing positioned along the threaded portion of the conduit inner surface, wherein an inside diameter of the bushing is less than an inside diameter of a first axial end of the insert.

20. The connector assembly of claim 19, further comprising a compression nut having a threaded inner surface in engagement with the second threaded portion of the insert, and an inner chamfer in engagement with the second axial end of the compression ring.

* * * * *